(12) United States Patent
Hiltch (10) Patent No.: US 12,511,701 B2
(45) Date of Patent: *Dec. 30, 2025

(54) SYSTEM AND METHOD FOR DETECTING RELEVANT POTENTIAL PARTICIPATING ENTITIES

(71) Applicant: Skyline AI Ltd., Tel Aviv (IL)

(72) Inventor: Or Hiltch, Rishon LeZion (IL)

(73) Assignee: Skyline AI Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/890,449

(22) Filed: Sep. 19, 2024

(65) Prior Publication Data

US 2025/0014128 A1    Jan. 9, 2025

Related U.S. Application Data (63) Continuation of application No. 17/124,221, filed on Dec. 16, 2020, now Pat. No. 12,118,634, which is a continuation-in-part of application No. 17/071,259, filed on Oct. 15, 2020, now Pat. No. 11,194,844.

(60) Provisional application No. 63/077,951, filed on Sep. 14, 2020, provisional application No. 63/073,196, filed on Sep. 1, 2020.

(51) Int. Cl.
| | | |
|---|---|---|
| *G06F 16/00* | (2019.01) | |
| *G06F 16/901* | (2019.01) | |
| *G06N 20/00* | (2019.01) | |
| *G06Q 30/0201* | (2023.01) | |
| *G06Q 50/16* | (2012.01) | |

(52) U.S. Cl.
CPC ......... *G06Q 50/167* (2013.01); *G06F 16/902* (2019.01); *G06N 20/00* (2019.01); *G06Q 30/0201* (2013.01)

(58) Field of Classification Search
None
See application file for complete search history.

(56) References Cited

U.S. PATENT DOCUMENTS

| | | |
|---|---|---|
| 5,500,793 A | 3/1996 | Deming, Jr. et al. |
| 7,076,452 B2 | 7/2006 | Florance et al. |

(Continued)

*Primary Examiner* — Tuankhanh D Phan
(74) *Attorney, Agent, or Firm* — Troutman Pepper Locke LLP (57) ABSTRACT

A method and system for detecting relevant potential participating entities across different databases. A method includes retrieving transaction data related to potential participating entities by resolving each of the plurality of potential participating entities between a dataset including transaction data and a dataset indicating the plurality of potential participating entities, wherein resolving the plurality of potential participating entities further includes applying resolution rules requiring matching a plurality of features between respective instances of the potential participating entity in the transaction data and in the dataset indicating the plurality of potential participating entities; determining a plurality of relevance scores based on the retrieved transaction data and entity characteristics of a subject entity, wherein each relevance score represents a relevance of the subject entity with respect to a respective potential participating entity; and identifying, based on the plurality of relevance scores, at least one relevant potential participating entity.

24 Claims, 4 Drawing Sheets

(56) References Cited

U.S. PATENT DOCUMENTS

| | | |
|---|---|---|
| 7,254,559 B2 | 8/2007 | Florance et al. |
| 7,333,943 B1 | 2/2008 | Charuk et al. |
| 7,386,565 B1 | 6/2008 | Singh et al. |
| 7,640,204 B2 | 12/2009 | Florance et al. |
| 8,140,442 B2 | 3/2012 | Heyer |
| 8,566,172 B2 | 10/2013 | Polston et al. |
| 9,424,861 B2 | 8/2016 | Jerram et al. |
| 10,019,767 B2 | 7/2018 | Dickson |
| 10,997,788 B2 | 5/2021 | Cardonha et al. |
| 12,118,634 B2 * | 10/2024 | Hiltch ............... G06N 20/00 |
| 2003/0135512 A1 | 7/2003 | Morgan et al. |
| 2003/0229592 A1 | 12/2003 | Florance et al. |
| 2006/0190279 A1 | 8/2006 | Heflin |
| 2008/0301162 A1 | 12/2008 | Wall et al. |
| 2009/0132316 A1 | 5/2009 | Florance et al. |
| 2009/0172035 A1 | 7/2009 | Lessing et al. |
| 2009/0182679 A1 | 7/2009 | Harrington |
| 2009/0187533 A1 | 7/2009 | Butler et al. |
| 2009/0204590 A1 | 8/2009 | Yaskin et al. |
| 2009/0271348 A1 | 10/2009 | Allen et al. |
| 2011/0093353 A1 | 4/2011 | Nutter et al. |
| 2013/0185314 A1 | 7/2013 | Rubinstein et al. |
| 2013/0198197 A1 | 8/2013 | Sawhney et al. |
| 2013/0304657 A1 | 11/2013 | Miller et al. |
| 2014/0279386 A1 | 9/2014 | Meyer et al. |
| 2014/0279400 A1 | 9/2014 | Allnutt |
| 2015/0199766 A1 | 7/2015 | Vilmont |
| 2016/0048934 A1 | 2/2016 | Gross |
| 2016/0055233 A1 | 2/2016 | Wang et al. |
| 2016/0086294 A1 | 3/2016 | Khamis |
| 2016/0292800 A1 | 10/2016 | Smith |
| 2017/0124216 A1 | 5/2017 | Miller et al. |
| 2018/0225577 A1 | 8/2018 | Krauss |
| 2018/0285957 A1 | 10/2018 | Ng et al. |
| 2019/0205465 A1 * | 7/2019 | Kulkarni ............... G06F 16/345 |
| 2020/0106798 A1 | 4/2020 | Lin |
| 2020/0120707 A1 | 4/2020 | Hussein et al. |
| 2020/0286194 A1 | 9/2020 | Li |
| 2021/0233319 A1 | 7/2021 | Cardonha et al. |

* cited by examiner

SYSTEM AND METHOD FOR DETECTING RELEVANT POTENTIAL PARTICIPATING ENTITIES

CROSS-REFERENCE TO RELATED APPLICATIONS

This application is a continuation of U.S. patent application Ser. No. 17/124,221, filed Dec. 16, 2020, which claims the benefit of U.S. Provisional Patent Application Ser. No. 63/077,951, filed on Sep. 14, 2020, and which is also a continuation-in-part of U.S. patent application Ser. No. 17/071,259, filed on Oct. 15, 2020 (now U.S. Pat. No. 11,194,844, issued Dec. 7, 2021), which claims the benefit of U.S. Provisional Patent Application Ser. No. 63/073,196, filed on Sep. 1, 2020.

The contents of the above-referenced applications are hereby incorporated by reference.

TECHNICAL FIELD

The present disclosure relates generally to entity resolution among different databases, and more specifically resolving entities in order to identify relevant potential participating entities.

BACKGROUND

Although technological advances have been introduced in most industrial areas to improve efficiency and productivity, the real-estate domain currently requires a massive use of manual labor to perform tedious and costly steps. In some cases, it may be desirable for entities such as brokers and other interested parties to locate potential buyers who may be interested in certain real estate properties. Such properties may include commercial real estate, multi-family houses, residential buildings, and the like.

Locating potential buyers that may be interested in a particular real estate property among a wide range of potential buyers may be a complicated and time-consuming process. Information about these potential buyers may be stored in multiple databases, making searching even more cumbersome. Presenting a potential buyer with irrelevant real estate properties may not only waste the potential buyer's time, but may also damage a relationship between the buyer and the broker who presents the offer because the buyer may place less trust in the broker's judgment.

Another challenge for presenting properties to a relevant buyer is caused by the need to accurately identify appearances of the same entity in different databases. Databases frequently store the same, similar, or otherwise related information as data in different formats. This is particularly true when different databases are maintained by different companies. As a result of these differences, entities may be inaccurately determined to be indistinct from each other. Consequently, certain properties may be inadvertently offered to the same buyer multiple times. Further, if supplemental information related to a potential buyer is needed, it is difficult to obtain such supplemental information without first accurately identifying the real estate property. For example, transaction history related to a buyer may provide sufficient information to determine that a potential buyer may be interested in a property but may fail to include contact information needed to actually contact that potential buyer in order to offer the real estate property.

Solutions for providing accurate and efficient detection of potential buyers which are likely relevant for a real estate property are desirable.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for detecting a relevant potential participating entity across different databases. The method comprises: retrieving transaction data related to each of a plurality of potential participating entities, wherein retrieving the transaction data further comprises resolving each of the plurality of potential participating entities between a dataset including the transaction data and a dataset indicating the plurality of potential participating entities, wherein resolving the plurality of potential participating entities further comprises applying resolution rules requiring at least matching a plurality of features between respective instances of the potential participating entity in the transaction data and in the dataset indicating the plurality of potential participating entities, wherein each potential participating entity is resolved such that different instances of the potential participating entity are determined as uniquely identifying the same potential participating entity; determining a plurality of relevance scores based on the retrieved transaction data and entity characteristics of a subject entity, wherein each relevance score represents a relevance of the subject entity with respect to a respective potential participating entity of the plurality of potential participating entities; and identifying, based on the plurality of relevance scores, at least one relevant potential participating entity with respect to the subject entity.

Certain embodiments disclosed herein also include a non-transitory computer readable medium having stored thereon causing a processing circuitry to execute a process, the process comprising: retrieving transaction data related to each of a plurality of potential participating entities, wherein retrieving the transaction data further comprises resolving each of the plurality of potential participating entities between a dataset including the transaction data and a dataset indicating the plurality of potential participating entities, wherein resolving the plurality of potential participating entities further comprises applying resolution rules requiring at least matching a plurality of features between respective instances of the potential participating entity in the transaction data and in the dataset indicating the plurality of potential participating entities, wherein each potential participating entity is resolved such that different instances of the potential participating entity are determined as uniquely identifying the same potential participating entity; determining a plurality of relevance scores based on the retrieved transaction data and entity characteristics of a subject entity, wherein each relevance score represents a relevance of the subject entity with respect to a respective potential participating entity of the plurality of potential participating entities; and identifying, based on the plurality of relevance scores, at least one relevant potential participating entity with respect to the subject entity.

Certain embodiments disclosed herein also include a system for detecting a relevant subject entity across different databases. The system comprises: a processing circuitry; and a memory, the memory containing instructions that, when executed by the processing circuitry, configure the system to: retrieve transaction data related to each of a plurality of potential participating entities, wherein retrieving the transaction data further comprises resolving each of the plurality of potential participating entities between a dataset including the transaction data and a dataset indicating the plurality of potential participating entities, wherein resolving the plurality of potential participating entities further comprises applying resolution rules requiring at least matching a plurality of features between respective instances of the potential participating entity in the transaction data and in the dataset indicating the plurality of potential participating entities, wherein each potential participating entity is resolved such that different instances of the potential participating entity are determined as uniquely identifying the same potential participating entity; determine a plurality of relevance scores based on the retrieved transaction data and entity characteristics of a subject entity, wherein each relevance score represents a relevance of the subject entity with respect to a respective potential participating entity of the plurality of potential participating entities; and identify, based on the plurality of relevance scores, at least one relevant potential participating entity with respect to the subject entity.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include systems and methods for identifying relevant potential participating entities with respect to a given subject entity in various databases. The disclosed embodiments allow for identifying potential participating entities which are likely to be interested in a particular subject entity. Each potential participating entity is an entity who has previously engaged in transactions involving subject entities and who may be interested in conducting transactions to acquire (or acquire interest in) subject entities that are relevant to them. The subject entity may be a real estate property which is or could be for sale, rent, or both.

A request to identify one or more potential participating entities for a transaction involving a particular subject entity is received. A relevance score model is applied to historical transaction data related to multiple potential participating entities as well as subject entity characteristics of the subject entity in order to generate a relevance score for the subject entity with respect to each of the potential participating entities.

The relevance scores may be determined using a machine learning model trained based on training transaction data and training subject entity characteristics. One or more relevant potential participating entities with respect to the subject entity are identified based on the relevance scores. In some embodiments, only subject entities having a relevance score above a threshold are identified as relevant.

In an embodiment, the transaction data used for determining the relevance scores is retrieved from one or more databases. To this end, instances of the potential participating entities are resolved between historical transaction data and potential participating entity data. The historical transaction data includes data related to prior transactions involving subject entities. Each transaction is performed between two or more participating entities such as, but not limited to, a buyer and a seller. The potential participating entity data includes a list of potential participating entities associated with known subject entities. For example, the potential participating entity data may include a list of potential buyers who own various real estate properties. The list of potential participating entities may include, but is not limited to, a list of potential participating entities for which contact information is known, a list of potential participating entities which have a relationship with a seller of the subject entity, and the like.

In a further embodiment, resolving the entities includes applying resolution rules to data of each entity. The resolution rules include rules for uniquely identifying an entity regardless of original format. Accordingly, the disclosed embodiments provide an objective rules-based system for resolving entities to be used in identifying relevant potential participating entities.

By resolving the potential participating entities between different datasets, instances of the same potential participating entity in both the historical transaction data and the potential participating entity data may be accurately identified in an objective manner. This allows for confirming that instances of a particular potential participating entity in the transaction data are, in fact, the same as instances in the potential participating entity data. This, in turn, provides more accurate retrieval of appropriate transaction data for each of the potential participating entities and, therefore, more accurate determination of relevance scores with respect to those potential participating entities.

In this regard, it has been identified that data related to transactions and data related to entities participating in those transactions may be stored in different formats, which can cause information such as address, name, title, or other features of the same buyer to appear differently in different databases. More specifically, there are no globally unique identifiers used for entities in different databases. Manually evaluating whether two data entries representing potential participating entities in fact represent the same underlying entity therefore often requires a subjective evaluation of whether the data entries are "close enough." Differences in database formatting may cause redundant instances of the same entity to be inaccurately identified as different entities.

Inaccurately failing to recognize such redundant results may result in providing recommendations of a subject entity to the same potential participating entity multiple times, which unnecessarily utilizes network bandwidth needed to communicate such results and may cause user disengagement due to lack of trust regarding accuracy of results and/or annoyance at the repeated identical recommendations. The disclosed embodiments provide a rules-based approach which considers various data points in order to uniquely identify entities regardless of particular formatting, thereby allowing for an objective analysis which improves consistency and accuracy of results.

In a further embodiment, supplemental transaction data may be identified by resolving instances of potential participating entities indicated in transaction data and in potential participating entity data. Potential participating entities indicated in a first database storing transaction data and in one or more second databases of potential participating entity data are resolved in order to uniquely identify instances of each potential participating entity in each database. Data related to the resolved potential participating entities are extracted from the second databases and utilized to enrich the transaction data.

Enriching the transaction data using such supplemental data allows for more accurately determining relevance scores and, consequently, more accurately identifying relevant potential participating entities for a given subject entity. In this regard, it has been identified that transaction data often only provides partial information about a particular participant (e.g., a buyer or seller) such that the characteristics of the participant related to why the subject entity was of interest may not be included in the transaction data and, accordingly, the accuracy of identifying relevant potential participating entities based on such transaction data may be lower than if more data was available. However, as noted above, there is no standard formatting for databases storing real estate data and other data which may indicate potential participating entities. Thus, resolving subject entities as described herein allows for accurately identifying instances of a potential participating entity in different databases in order to find appropriate supplemental data which, in turn, allows for more accurately identifying relevant potential participating entities.

Figure 1:
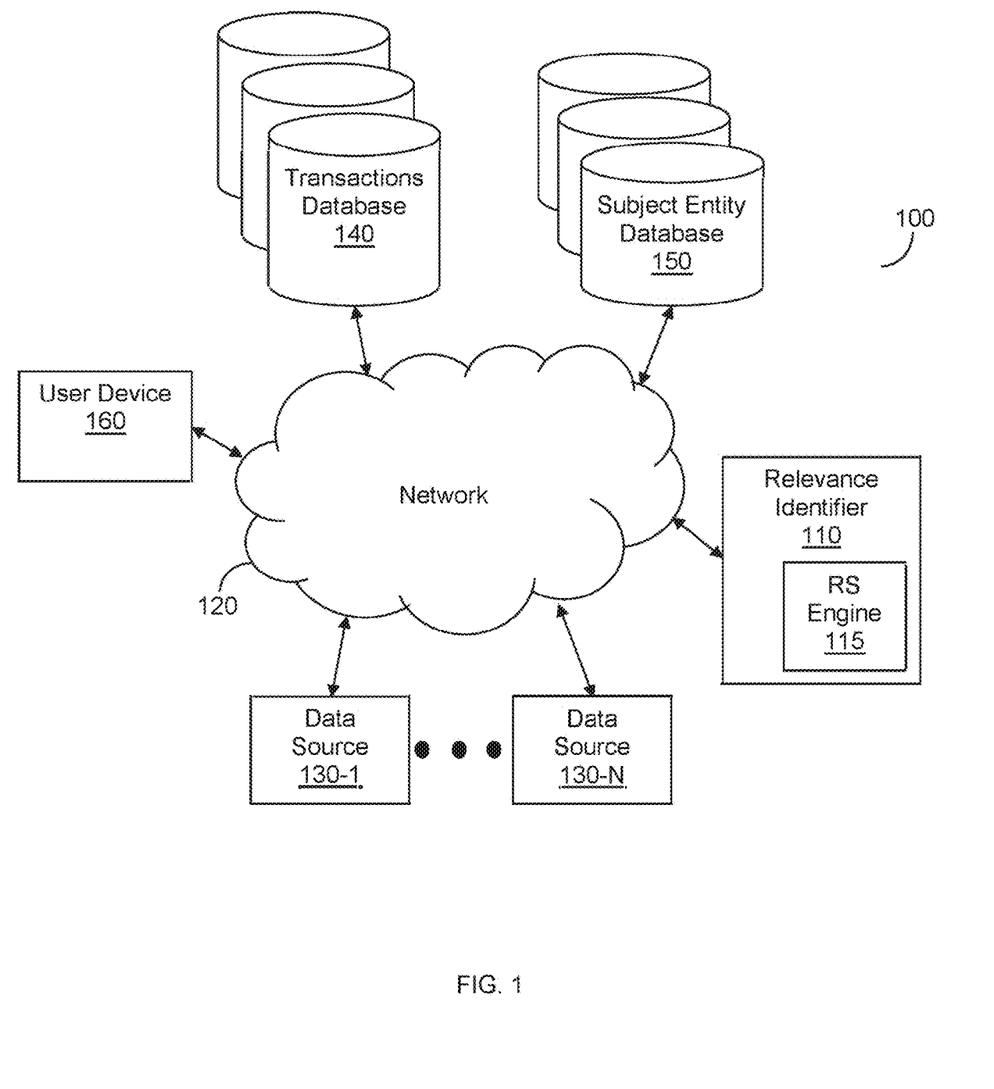
FIG. 1 is a network diagram utilized to describe the various embodiments.

FIG. 1 is an example network diagram 100 utilized to describe the disclosed embodiments. In the network diagram 100, a relevance identifier 110 communicates with data sources 130-1 through 130-N via a network 120. The network 120 may be the Internet, the world-wide-web (WWW), a local area network (LAN), a wide area network (WAN), a metro area network (MAN), combinations thereof, and the like.

The plurality of data sources 130-1 through 130-N (hereinafter referred to as a data source 130 or data sources 130 for simplicity) store data related to characteristics of potential participating entities such as potential buyers. The data sources 130 may include public or private websites, such as real estate related websites, similar web sources, and the like.

The transactions databases 140 store transaction data related to transactions involving transfer of part or all of the interest in a subject entity. In particular, such transaction data includes identifiers of the buyer, seller, and the subject entity being transferred in each transaction. The transaction data may further include parameters related to the transaction such as, but not limited to, sale price.

The subject entity databases 150 store subject entity data for various subject entities. The subject entity data may include, but is not limited to, identifiers of subject entities, addresses, price, location, size, number of units, occupancy, socioeconomic status in the area, job opportunities, combinations thereof, and the like.

Each of the transactions databases 140 and the subject entity databases 150 may be, but is not limited to, a data warehouse, a cloud database, governmental databases, and the like.

According to the disclosed embodiments, the relevance identifier 110 is configured to extract and analyze data for detecting one or more relevant potential participating entities for a subject entity. The subject entity may be, but is not limited to, commercial real estate, a multi-family house, a residential building, and the like. Each potential participating entity is a potential buyer or other entity who may wish to purchase or rent a relevant subject entity. A relevant potential participating entity for a subject entity may be a potential buyer who might be interested in a property having particular characteristics belonging to the subject entity. For example, a potential buyer may find a certain real estate property as relevant or irrelevant based on the property's location, size, number of units, occupancy, socioeconomic status in the area, job opportunities, and the like.

In an embodiment, the relevance identifier 110 receives a request to detect at least one potential participating entity that is relevant for at least a subject entity having a first set of characteristics. The request may be an electronic request sent from a user device such as personal computer (PC), laptop, smartphone, etc.

A potential participating entity may be, for example, a private company, a public company, an individual, a non-profit entity, and the like. The subject entity may be, but is not limited to, a property that is currently for sale or a property that is not for sale (off-market properties). A subject entity may be relevant for a potential participating entity based on several parameters as further discussed below. More specifically, subject entity characteristics of the subject entity may, in view of a potential participating entity's transaction history, result in determining that the subject entity is relevant to the potential participating entity's preferences and/or interests.

The relevance identifier 110 is configured to collect a first dataset including subject entity data for the subject entity. The subject entity is associated with respective subject entity characteristics such that the first dataset includes those subject entity characteristics. The first dataset may be extracted from one or more data sources (e.g., the data source 130-1). The subject entity characteristics may include, but is not limited to, price, location, number of units, occupancy, and so on.

The relevance identifier 110 may optionally be configured to collect a second dataset that includes characteristics of potential participating entities which may be pertinent to preferences and/or interests of each of those potential participating entities such that those characteristics, when used to enrich the transaction data, allows for more accurately determining relevance scores each of the potential participating entities with respect to a given subject entity. Such characteristics of the potential participating entities may include, but are not limited to, any explicit requirements or preferences (e.g., size requirements, price ranges, etc.), whether the potential participating entity is an individual or a business, family size for an individual, combinations thereof, and the like.

The second dataset may be extracted from a database (e.g., the database 140), a data source (e.g., the data source 130-1), and the like. The second dataset may be used to enrich the transaction data, thereby improving accuracy of relevance scores determined using that transaction data. To this end, the relevance identifier 110 may be configured to resolve each potential participating entity between the transaction data and one or more databases storing entity characteristics of potential participating entities to uniquely identify the potential participating entities in both such databases and to identify appropriate supplemental data for each potential participating entity (i.e., supplemental data that is associated with that potential participating entity).

The relevance identifier 110 is also configured to collect a third dataset of historical transaction data for each of a set of potential participating entities. Historical transaction data may be indicative of types of real estate properties usually purchased or rented by the potential participating entity, properties' locations, prices, number of units, real estate properties the potential buyer recently sold, and the like. The third dataset may be extracted from a data source (e.g., the data source 130-1), a database (e.g., the database 140), or both. That is, some of the transaction data may be previously gathered and stored in a database from which the data may be extracted, and some of the real estate transaction history may be gathered by searching through one or more data sources, e.g., real estate websites.

In an embodiment, the relevance identifier 110 is configured to apply a model to the first dataset, the second dataset, and the third dataset. The model, such as a machine learning algorithm, is adapted to determine a relevance score for each of a plurality of potential participating entities with respect to the subject entity. To this end, in a further embodiment, the relevance identifier 110 may be further configured with a relevance score (RS) engine 115 configured to determine relevance scores as described herein.

Each relevance score may represent a probability that the subject entity is relevant to a respective potential participating entity's transactional interests. As a non-limiting example, a relevance score may be a number from "1" to "5", where "1" represents the lowest probability that the subject entity is relevant to a particular potential participating entity and "5" represents the highest probability that the subject entity is relevant to a particular potential participating entity.

In an embodiment, only potential participating entities for which the determined relevance score is above a threshold are identified as relevant. The threshold value may be, for example, a predetermined value of "4" such that every subject entity having a probability score that is equal to or larger than "4" is relevant to a particular potential participating entity.

As a non-limiting example, the algorithm receives as an input (a) a first dataset that indicates a real estate property's address, number of units, size, and price; (b) a second dataset that indicates the characteristics of 1,000 potential buyers that were identified in the database or by searching through one or more on-line data sources; and (c) a third dataset indicating the transaction history of each of the 1,000 potential buyers. Relevance scores are determined for each potential buyer based on the first, second, and third datasets. By applying the algorithm to the collected datasets, only two potential buyers having a probability score that is above the predetermined threshold value are classified as potential buyers that may be interested in buying the real estate property.

It should be noted that, in order to provide an accurate probability score, multiple characteristics may be analyzed. That is, it may be desirable to analyze as many characteristics as possible in order to accurately predict what would be a relevant real estate property for a specific potential buyer. As noted above, additional characteristics which may be analyzed may include price, location, occupancy, number of units, size, socioeconomic status in the area, job opportunities, and the like.

In an embodiment, the relevance identifier 110 is configured to generate a notification upon identifying one or more relevant potential participating entities. The electronic notification may be a message or any other electronic notice. The electronic notification may include, but is not limited to, a recommendation to offer a potential buyer a specific real estate property having a relevance score that is above the predetermined threshold value. The electronic notification may also include a description of the reasons (e.g., parameters) that caused a certain subject entity to be relevant for the specific potential participating entity. As a non-limiting example, the notification may indicate that the potential buyer has been associated with the highest possible relevance score to be relevant for the particular real estate property based on ten different parameters (and show the ten parameters in the notifications). In an embodiment, the relevance identifier 110 may be configured to send the electronic notification to a predefined computerized source, such as, a server, an end-point device (e.g., the user device 160), and the like.

Figure 2:
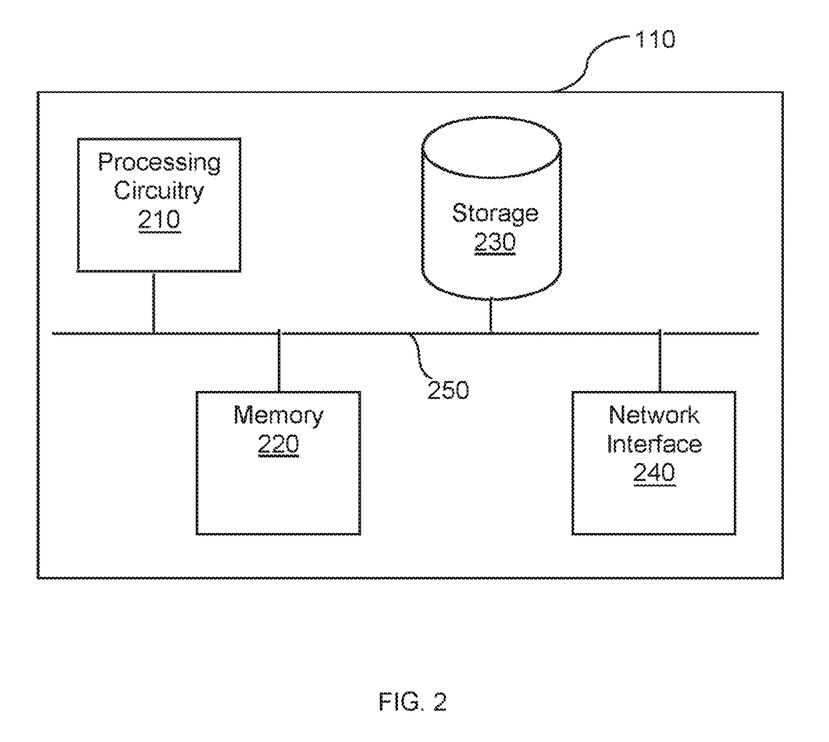
FIG. 2 is a schematic diagram of a relevance identifier according to an embodiment.

FIG. 2 is an example schematic diagram of the relevance identifier 110 according to an embodiment. The relevance identifier 110 includes a processing circuitry 210 coupled to a memory 220, a storage 230, and a network interface 240. In an embodiment, the components of the relevance identifier 110 are connected by a communication bus 260.

The processing circuitry 210 may be realized by one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), and the like, or any other hardware logic components that can perform calculations or other manipulations of information. The memory 115 may be volatile (e.g., RAM,), non-volatile (e.g., ROM, flash memory, and the like), or a combination thereof.

The storage 230 may be magnetic storage, optical storage, solid state storage, and the like and may be realized, for example, as flash memory or other memory technology, CD-ROM, DVDs or other optical storage, magnetic cassettes, magnetic tape, magnetic disk storage or other magnetic storage devices, or any other medium which can be used to store the desired information.

In one configuration, computer readable instructions to implement one or more embodiments disclosed herein may be stored in the storage 230. The storage 230 may also store other computer readable instructions to implement an operating system, an application program, and the like. Computer readable instructions may be loaded in the memory 220 for execution by the processing circuitry 210.

In another embodiment, the storage 230, the memory 220, or both, are configured to store software. Software shall be construed broadly to mean any type of instructions, whether referred to as software, firmware, middleware, microcode, or hardware description language. Instructions may include code (e.g., in source code format, binary code format, executable code format, or any other suitable format of code). The instructions cause the processing circuitry 210 to perform the various functions described herein.

The network interface 240 allows the relevance identifier 110 to communicate with external sources. For example, the network interface 240 may be configured to access or communicate with a network or various data sources.

In an embodiment, the network interface 240 allows remote access to the relevance identifier 110 for the purpose of, for example, configuration, reporting, and the like. The network interface 240 may include a wired connection or a wireless connection. The network interface 240 may transmit communication media, receive communication media, or both. For example, the network interface 240 may include a modem, a network interface card (NIC), an integrated network interface, a radio frequency transmitter/receiver, an infrared port, a USB connection, and the like.

Figure 3:
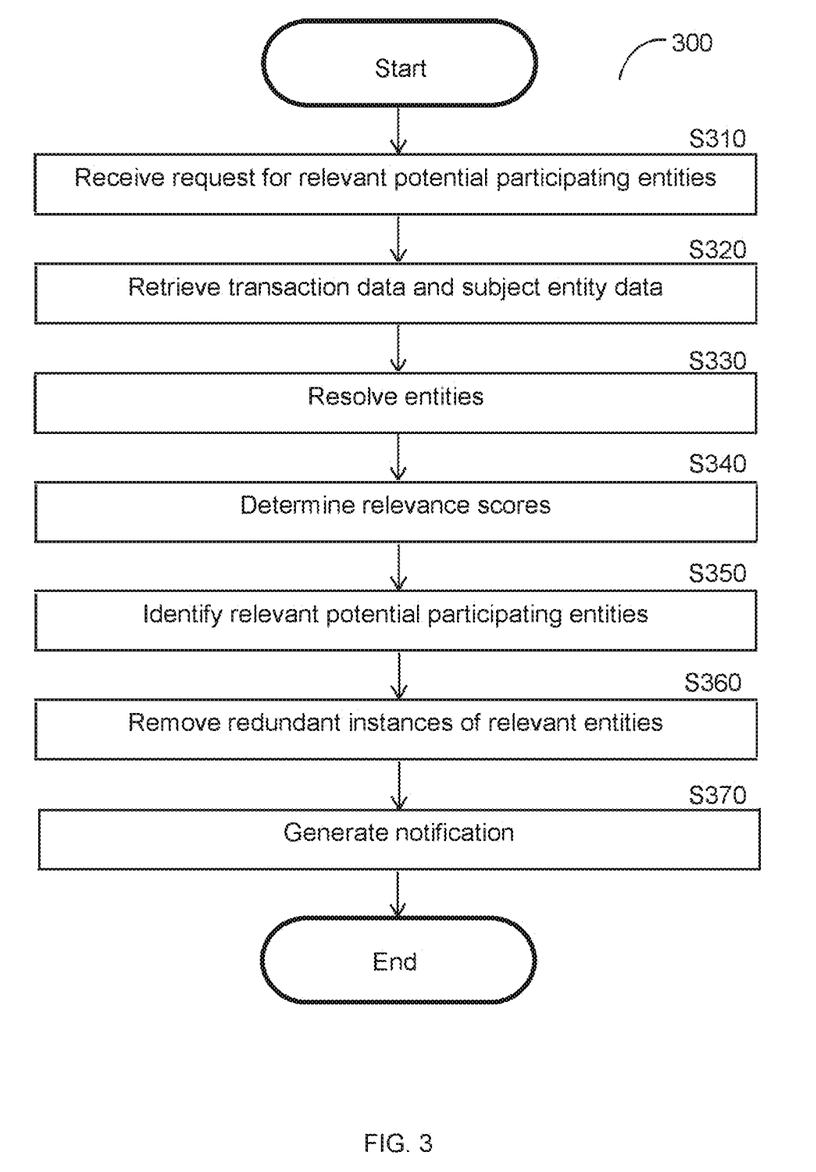
FIG. 3 is a flowchart illustrating a method for identifying a relevant potential participating entity property for a given subject entity according to an embodiment.

FIG. 3 is an example flowchart 300 illustrating a method for identifying relevant potential participating entities with respect to a given subject entity according to an embodiment. In an embodiment, the method is performed by the relevance identifier 110, FIG. 1.

At S310, a request for potential participating entities to which a subject entity may be relevant is received. The request may be for a potential participating entity such as, but not limited to, a potential buyer. The subject entity may be, but is not limited to, an on-the-market or off-market real estate property.

The request may further include characteristics of the subject entity. Alternatively, or collectively, the request may include an identifier of the subject entity. To this end, in some embodiments, S310 may further include retrieving data indicating subject entity characteristics of the subject entity.

At S320, transaction data related to a set of potential participating entities and subject entity data indicating characteristics of the subject entity are each retrieved from a database. The subject entity data may be stored in a first database and the transaction data may be stored in one or more second databases.

The potential participating entity data includes a list of potential participating entities associated with known subject entities. For example, the potential participating entity data may include a list of potential buyers who own various real estate properties. The list of potential participating entities may include, but is not limited to, a list of potential participating entities for which contact information is known, a list of potential participating entities which have a relationship with a seller of the subject entity, and the like.

In an embodiment, S320 includes retrieving the transaction data for each of the potential participating entities from one or more databases. In a further embodiment, instances of the potential participating entities are resolved between historical transaction data and potential participating entity data in order to identify the transaction data to be retrieved. The historical transaction data includes data related to prior transactions involving subject entities. Each transaction is performed between two or more participating entities such as, but not limited to, a buyer and a seller.

To this end, S320 further includes resolving instances of each of the potential participating entities by applying resolution rules to instances of potential participating entities indicated in a database storing transaction data and one or more databases storing a list of potential participating entities. The resolution rules include rules for uniquely identifying an entity regardless of original format such as, but not limited to, rules requiring a threshold number of matching features, rules for matching features, rules defining synonyms, combinations thereof, and the like. In an embodiment, the resolution may be performed as described further below with respect to FIG. 4.

At optional S330, the retrieved transaction data may be enriched using supplemental data for any or all of the potential participating entities. The supplemental data may include, but is not limited to, characteristics of each potential participating entity. Such characteristics may include, but are not limited to, explicit requirements or preferences (e.g., size requirements, price ranges, etc.), whether the potential participating entity is an individual or a business, family size for an individual, combinations thereof, and the like.

In an embodiment, S330 includes resolving each of the potential participating entities indicated in the transaction data with potential participating entities indicated in one or more databases storing characteristics of those entities. In a further embodiment, the resolution may be performed as described below with respect to FIG. 4.

At S340, a relevance score is determined for the subject entity with respect to each of the potential participating entities based on the transaction data and subject entity characteristics data related to the subject entity. Each relevance score indicates a probability that the subject entity is relevant to the respective potential participating entity (e.g., a likelihood that the subject entity would be of interest for a potential buyer).

In an embodiment, S340 includes applying a relevance model to the subject entity characteristics data and to the transaction data. In an embodiment, the relevance model is a machine learning model trained using training subject entity data and training transaction preference data.

At S350, one or more relevant potential participating entities for which the subject entity is relevant are identified. In an embodiment, subject entities having relevance scores above a threshold are identified as relevant to the potential participating entity.

At optional S360, redundant instances among the relevant potential participating entities are removed. In an embodiment, S360 includes resolving the instances among the identified relevant potential participating entities as described below with respect to FIG. 4. By resolving the instances of the relevant potential participating entities, those relevant potential participating entities can be uniquely identified such that any duplicate instances are accurately determined as redundant and removed. This, in turn, reduces consumption of any resources used to subsequently transmit data indicating such potential participating entities by avoiding re-transmitting data indicating the subject entity to the same potential participating entity multiple times.

At S370, a notification is generated based on the relevant potential participating entities. The notification may include, but is not limited to, a recommendation to offer the identified potential participating entities one or more of the relevant subject entities. The notification may further include a description of the reasons (e.g., the parameters among the analyzed data) that caused the subject entity to be classified as a relevant for a specific potential participating entity. Such reasons may be identified based on, for example, weights of the model and values of the respective parameters. For example, when a portion of the model as applied to a parameter yields a weighted value above a threshold, the parameter may be identified as a reason as to why the subject entity is relevant.

Figure 4:
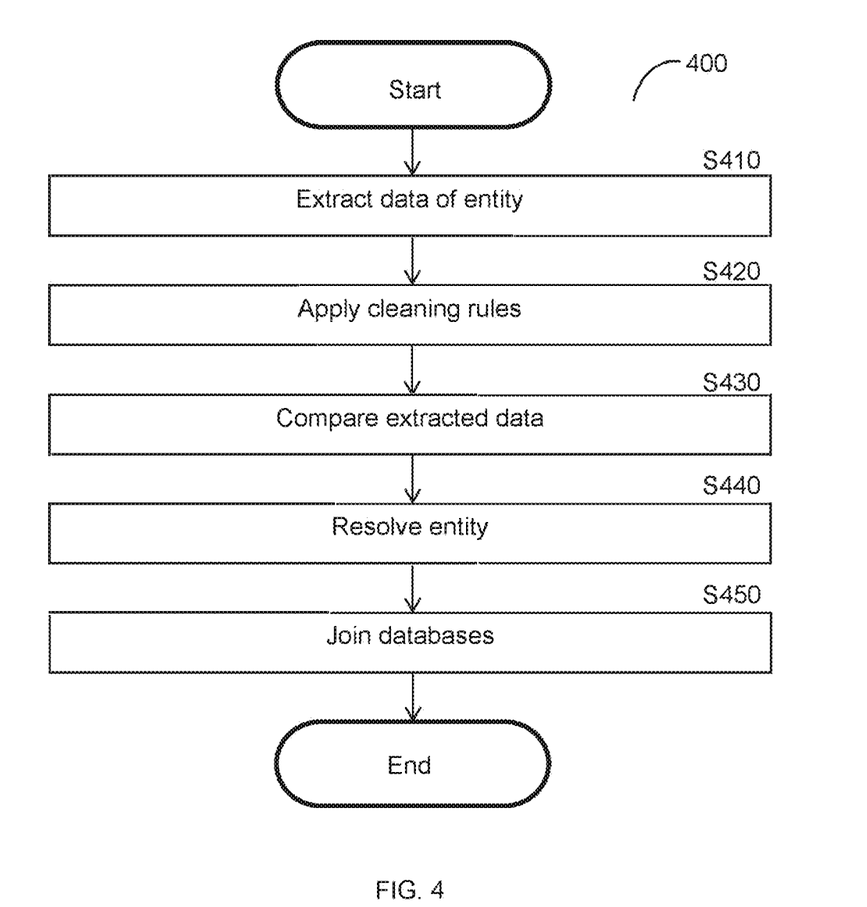
FIG. 4 is a flowchart illustrating a method for resolving entities between databases according to an embodiment.

FIG. 4 is a flowchart 400 illustrating a method for resolving entities according to an embodiment. In an embodiment, the method is performed by the relevance identifier 110, FIG. 1.

At S410, data related to the entity is extracted from a first database. More specifically, the extracted data includes data that is relevant to uniquely identifying the entity. The uniquely identifying data may include, but is not limited to, name, address, location, size, occupancy features (e.g., potential number of occupants, number of bedrooms, etc.), combinations thereof, and the like.

At S420, resolution rules for cleaning the extracted data are applied. Such cleaning resolution rules may include, but are not limited to, rules for removing common postfixes, rules for cleaning text (e.g., stripping spaces from text, converting uppercase to lowercase, etc.), rules for removing honorifics or titles from names, rules for removing common postfixes (e.g., "LLC," "Ltd.," "Inc.," etc.), combinations thereof, and the like. Such cleaning resolution rules provide rules for determining whether features which otherwise do not match reflect the same underlying features.

At S430, the extracted data is compared to data of one or more entities indicated in a second database. In an embodiment, S430 may include identifying matching features between the instance of the entity in the first database and the data in the second database.

At S440, the entity is resolved based on the comparison. In an embodiment, resolving the entity includes identifying any instances of the entity in the second database. The entity resolution is performed using resolution rules that collectively define whether two instances of data representing entities effectively represent the same uniquely identified entity. The resolution rules provide rules accounting for multiple factors that collectively uniquely identify a particular entity, and different resolution rules may be utilized for different types of entities. To this end, in an embodiment, S440 may include determining a type of entity to be resolved and applying appropriate resolution rules for that type of entity.

The resolution rules collectively define requirements for uniquely identifying the entity in different datasets and may include, but are not limited to, requirements for a number of matching features. More specifically, the resolution rules require matching between multiple features included in different instances of entities in order to identify those instances as representing the same underlying entity. Each instance of an entity may be an entry in a database or other data source indicating information that may be related to an entity. In an embodiment, S440 includes applying such resolution rules to determine whether instances of entities in the first and second databases represent the same underlying entity.

By using resolution rules requiring multiple matching features, an entity can be uniquely identified as existing in different databases despite any differences in format or specific features. As a non-limiting example, rather than solely relying on address to identify an entity, multiple features including number of units, vintage, latitude and longitude, and the like, may be utilized to determine whether two instances of entities represent the same entity. Further, by cleaning the data as noted above with respect to S420, individual features are more likely to be matched accurately despite common differences in formatting.

In this regard, it is noted that manual resolution of entities in databases is infeasible due to the sheer volume of entries. Regardless, manual resolution of entities requires subjective evaluations regarding entity similarity as expressed in different databases. As a result, different human observers may come to different conclusions as to whether different instances of entities represent the same underlying entity. More specifically, such manual resolution of entities may involve subjectively determining whether names, addresses, or descriptions of entities "feel" sufficiently similar, which may cause some human observers to determine that two instances of entities represent the same underlying entity while other human observers determine that the instances represent different underlying entities. The resolution rules provide an objective set of rules which provide consistent and accurate results as compared to manual entity resolution.

It has further been identified that, aside from formatting differences, data related to an entity may include minor errors which may have a significant impact on whether the data "appears" to represent the same entity from the perspective of a manual observer. For example, one instance of an entity may mistakenly indicate a home address of "123 ABC Street" when the address of the actual entity is "125 ABC Street." A human observer may or may not recognize that these instances represent the same underlying real estate property. The resolution rules, which utilize multiple rules defining minimum requirements for matching entities, provide a mechanism for uniquely identifying an entity regardless of such mistakes or other differences.

The resolution rules may further include rules for determining whether specific features of entities match such as, but not limited to, rules defining abbreviations, rules defining synonyms, rules defining partial matches, and the like. As a non-limiting example, an address may appear in one database as "123 Fannie Road" and in another database as "123 Fannie Rd," and the resolution rules may define "Rd" as an abbreviation of "Road" such that these entries would match. As another non-limiting example, resolution rules defining partial matches may indicate that an address partially matches if either the number of the address (e.g., "123") or the named portion of the address (e.g., "Fannie Road") matches but the other does not match.

At optional S450, the databases storing the resolved entity may be joined. In an embodiment, S450 includes performing a JOIN operation between the databases. In a further embodiment, S450 further includes storing or updating a table mapping instances of the entity to each other such that the instances are effectively marked as being instances of the same entity. Joining the databases allows for designating different instances of entities as the same, thereby avoiding redundant resolution of entities between the two databases.

It should be noted that FIG. 4 is described with respect to resolving entities between different databases for simplicity purposes, but that entities may be equally resolved between datasets or other organizations of data without departing from the scope of the disclosure.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for detecting relevant potential participating entities, comprising:
    retrieving transaction data related to each of a plurality of potential participating entities;
    resolving each of the plurality of potential participating entities between a dataset including the transaction data and a dataset indicating the plurality of potential participating entities by applying resolution rules requiring at least matching a plurality of features between respective instances of the potential participating entity in the transaction data and in the dataset indicating the plurality of potential participating entities;
        wherein each potential participating entity is resolved such that different instances of the potential participating entity are determined as uniquely identifying the same potential participating entity;
        wherein the plurality of features between respective instances of the potential participating entity in the transaction data and in the dataset indicating the plurality of potential participating entities are determined to match when minimum requirements comprising minor error rules configured to identify a match between correlated parts of datasets with data entry differences are satisfied;
    joining the dataset including the transaction data and the dataset indicating the plurality of potential participating entities based on the resolved potential participating entities to create a unified dataset mapping different instances of each potential participating entity as representing the same entity;
    determining a plurality of relevance scores based on the retrieved transaction data and entity characteristics of a subject entity, wherein each relevance score represents a relevance of the subject entity with respect to a respective potential participating entity of the plurality of potential participating entities; and
    identifying, based on the plurality of relevance scores, at least one relevant potential participating entity with respect to the subject entity.

2. The method of claim 1, wherein the respective relevance score for each relevant potential participating entity is above a threshold.

3. The method of claim 1, further comprising:
    identifying at least one redundant instance among the plurality of relevant potential participating entities; and
    removing the at least one redundant instance from the plurality of relevant potential participating entities to determine at least one unique relevant potential participating entity.

4. The method of claim 1, wherein the plurality of relevance scores is determined using a machine learning model trained based on training subject entity data and training transaction data.

5. The method of claim 1, wherein the resolution rules include cleaning resolution rules for cleaning the transaction data related to entities.

6. The method of claim 1, wherein the resolution rules include requirements for a minimum number of matching features.

7. The method of claim 1, further comprising:
    identifying supplemental data for at least one of the plurality of potential participating entities; and
    enriching the transaction data with the identified supplemental data, wherein the plurality of relevance scores is determined based further on the enriched transaction data.

8. The method of claim 1, further comprising:
    generating a notification based on the at least one relevant potential participating entity; and
    sending the notification to a user device.

9. A non-transitory computer readable medium having stored thereon programmed instructions for causing processing circuitry to execute a process to:
    retrieve transaction data related to each of a plurality of potential participating entities;
    resolve each of the plurality of potential participating entities between a dataset including the transaction data and a dataset indicating the plurality of potential participating entities by applying resolution rules requiring at least matching a plurality of features between respective instances of the potential participating entity in the transaction data and in the dataset indicating the plurality of potential participating entities;
        wherein each potential participating entity is resolved such that different instances of the potential participating entity are determined as uniquely identifying the same potential participating entity;
        wherein the plurality of features between respective instances of the potential participating entity in the transaction data and in the dataset indicating the plurality of potential participating entities are determined to match when minimum requirements comprising minor error rules configured to identify a match between correlated parts of datasets with data entry differences are satisfied;
    joining the dataset including the transaction data and the dataset indicating the plurality of potential participating entities based on the resolved potential participating entities to create a unified dataset mapping different instances of each potential participating entity as representing the same entity;
    determine a plurality of relevance scores based on the retrieved transaction data and entity characteristics of a subject entity, wherein each relevance score represents a relevance of the subject entity with respect to a respective potential participating entity of the plurality of potential participating entities; and identify, based on the plurality of relevance scores, at least one relevant potential participating entity with respect to the subject entity.

10. The non-transitory computer readable medium of claim 9, wherein the respective relevance score for each relevant potential participating entity is above a threshold.

11. The non-transitory computer readable medium of claim 9, wherein the programmed instructions further comprise instructions to:
identify at least one redundant instance among the plurality of relevant potential participating entities; and
remove the at least one redundant instance from the plurality of relevant potential participating entities to determine at least one unique relevant potential participating entity.

12. The non-transitory computer readable medium of claim 9, wherein the plurality of relevance scores is determined using a machine learning model trained based on training subject entity data and training transaction data.

13. The non-transitory computer readable medium of claim 9, wherein the resolution rules include cleaning resolution rules for cleaning the transaction data related to entities.

14. The non-transitory computer readable medium of claim 9, wherein the resolution rules include requirements for a minimum number of matching features.

15. The non-transitory computer readable medium of claim 9, wherein the programmed instructions further comprise instructions to:
identify supplemental data for at least one of the plurality of potential participating entities; and
enrich the transaction data with the identified supplemental data, wherein the plurality of relevance scores is determined based further on the enriched transaction data.

16. The non-transitory computer readable medium of claim 9, wherein the programmed instructions further comprise instructions to:
generate a notification based on the at least one relevant potential participating entity; and
send the notification to a user device.

17. A system for detecting a relevant potential participating entities, comprising:
processing circuitry; and
memory comprising programmed instructions that, when executed by the processing circuitry, configure the system to:
retrieve transaction data related to each of a plurality of potential participating entities;
resolve each of the plurality of potential participating entities between a dataset including the transaction data and a dataset indicating the plurality of potential participating entities by applying resolution rules requiring at least matching a plurality of features between respective instances of the potential participating entity in the transaction data and in the dataset indicating the plurality of potential participating entities;
wherein each potential participating entity is resolved such that different instances of the potential participating entity are determined as uniquely identifying the same potential participating entity;
wherein the plurality of features between respective instances of the potential participating entity in the transaction data and in the dataset indicating the plurality of potential participating entities are determined to match when minimum requirements comprising minor error rules configured to identify a match between correlated parts of datasets with data entry differences are satisfied;
join the dataset including the transaction data and the dataset indicating the plurality of potential participating entities based on the resolved potential participating entities to create a unified dataset mapping different instances of each potential participating entity as representing the same entity;
determine a plurality of relevance scores based on the retrieved transaction data and entity characteristics of a subject entity, wherein each relevance score represents a relevance of the subject entity with respect to a respective potential participating entity of the plurality of potential participating entities; and
identify, based on the plurality of relevance scores, at least one relevant potential participating entity with respect to the subject entity.

18. The system of claim 17, wherein the respective relevance score for each relevant potential participating entity is above a threshold.

19. The system of claim 17, wherein the programmed instructions further comprise instructions to:
identify at least one redundant instance among the plurality of relevant potential participating entities; and
remove the at least one redundant instance from the plurality of relevant potential participating entities to determine at least one unique relevant potential participating entity.

20. The system of claim 17, wherein the plurality of relevance scores is determined using a machine learning model trained based on training subject entity data and training transaction data.

21. The system of claim 17, wherein the resolution rules include cleaning resolution rules for cleaning the transaction data related to entities.

22. The system of claim 17, wherein the resolution rules include requirements for a minimum number of matching features.

23. The system of claim 17, wherein the programmed instructions further comprise instructions to:
identify supplemental data for at least one of the plurality of potential participating entities; and
enrich the transaction data with the identified supplemental data, wherein the plurality of relevance scores is determined based further on the enriched transaction data.

24. The system of claim 17, wherein the programmed instructions further comprise instructions to:
generate a notification based on the at least one relevant potential participating entity; and
send the notification to a user device.

* * * * *